US008799492B2

(12) United States Patent
Iinuma

(10) Patent No.: US 8,799,492 B2
(45) Date of Patent: Aug. 5, 2014

(54) ELECTRONIC DEVICE

(75) Inventor: Nobuharu Iinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 13/154,858

(22) Filed: Jun. 7, 2011

(65) Prior Publication Data
US 2012/0084446 A1 Apr. 5, 2012

(30) Foreign Application Priority Data

Sep. 30, 2010 (JP) ................................. 2010-223018

(51) Int. Cl.
G06F 15/16 (2006.01)
(52) U.S. Cl.
USPC .......................................... 709/229; 709/227
(58) Field of Classification Search
USPC ................................................. 709/227, 229
See application file for complete search history.

(56) References Cited

U.S. PATENT DOCUMENTS

| 7,689,169 | B2 * | 3/2010 | Lee et al. ...................... 455/41.2 |
| 8,321,917 | B2 * | 11/2012 | Kikkawa et al. .................. 726/5 |
| 2004/0063452 | A1 | 4/2004 | Tomoda |
| 2004/0097193 | A1 | 5/2004 | Nakatsuka |
| 2004/0147282 | A1 | 7/2004 | Nakasato et al. |
| 2007/0274270 | A1 * | 11/2007 | Jones et al. .................... 370/338 |
| 2008/0133757 | A1 * | 6/2008 | Etelapera ....................... 709/227 |
| 2009/0287922 | A1 * | 11/2009 | Herwono et al. ............. 713/155 |
| 2010/0278143 | A1 * | 11/2010 | Chun et al. ..................... 370/331 |
| 2010/0325485 | A1 * | 12/2010 | Kamath et al. .................. 714/15 |
| 2011/0177780 | A1 * | 7/2011 | Sato et al. ..................... 455/41.1 |

FOREIGN PATENT DOCUMENTS

| JP | 2004-120651 | 4/2004 |
| JP | 2004-235838 | 8/2004 |
| JP | 2006-230010 | 8/2006 |

OTHER PUBLICATIONS

Office Action issued by the Japanese Patent Office on Feb. 4, 2014 in the corresponding Japanese patent application No. 2010-223018.

* cited by examiner

Primary Examiner — Kenny Lin
(74) Attorney, Agent, or Firm — Staas & Halsey LLP

(57) ABSTRACT

An electronic device includes a storage, a communication device and a controller. The storage stores information identifying the electronic device. The controller, when starting connection of the electronic device with a first other electronic device, sends the information identifying the electronic device to a second other electronic device when the first other electronic device is connected to the second other electronic device, and connects the electronic device to the first other electronic device when a request for connection with the first other electronic device is received, the first other electronic device receiving the information identifying the electronic device from the other second electronic device.

15 Claims, 18 Drawing Sheets

FIG. 7

|  | SLAVE | | |
|---|---|---|---|
|  | PAIRING COMPLETED | CONNECTED | COMMUNICATING |
| MASTER 1 | ○ | × | × |
| MASTER 2 | ○ | ○ | ○ |
| MASTER 3 | ○ | × | × |
| MASTER 4 | ○ | × | × |

FIG. 8

|  | SLAVE | | |
|---|---|---|---|
|  | PAIRING COMPLETED | CONNECTED | COMMUNICATING |
| MASTER 1 | ○ | × | × |
| MASTER 2 | ○ | ○ | × |
| MASTER 3 | ○ | × | × |
| MASTER 4 | ○ | × | × |

FIG. 9

|  | SLAVE | | |
|---|---|---|---|
|  | PAIRING COMPLETED | CONNECTED | COMMUNICATING |
| MASTER 1 | ○ | ○ | ○ |
| MASTER 2 | ○ | × | × |
| MASTER 3 | ○ | × | × |
| MASTER 4 | ○ | × | × |

FIG. 11

| PRIORITY RANKING | NAME |
|---|---|
| 1 | MASTER 2 |
| 2 | MASTER 1 |
| 3 | MASTER 3 |
| 4 | MASTER 4 |

551a

ELECTRONIC DEVICE

CROSS-REFERENCE TO RELATED APPLICATIONS

This application is based upon and claims the benefit of priority from the prior Japanese Patent Application No. 2010-223018 filed on Sep. 30, 2010, the entire contents of which are incorporated herein by reference.

FIELD

Embodiments of the present disclosure relate to an electronic device having a communication function.

BACKGROUND

Recently, electronic devices using wireless communication technology with Bluetooth (registered trademark) have become widely used. For example, these types of electronic devices include information processing devices such as music players, mobile telephones, small mobile terminal devices, personal computers; output devices such as headphones and speakers; and input devices such as remote controllers, mice, and keyboards. There are wireless communication technologies, like the Bluetooth wireless technology, that can be used with other products whether or not the other products are made by the same manufacturer so long as the products conform to a unified standard or are compatible in other ways.

In wireless communication with Bluetooth, communication is conducted between a master device and a slave device. The master device starts and controls the wireless communication when communicating with the slave device. The slave device conducts wireless communication under the control of the master device, that is, the slave device serves as a destination device to be connected.

For example, multiple master devices (e.g., two personal computers) may use one slave device (e.g., one set of headphones; hereinafter also referred to as "a headphone"). In this case, when the slave device is connected to a first master device, a second master device (another master device) cannot use the slave device whether or not the slave device is being used at that time. The connection between the first master device and the slave device must be disconnected for the second master device to be able to use the slave device. This type of disconnection operation is troublesome for the user.

Moreover, if the connected first master device has an automatic reconnection function, the slave device will be automatically reconnected to the first master device due to the automatic reconnection function even if the user disconnects the connection between the slave device and the first master device. As a result, switching the connection to the second master device cannot be performed smoothly.

An object of the present disclosure is to provide an electronic device that can easily allow the switching of connections between multiple devices.

SUMMARY

According to an embodiment, an electronic device includes a storage, a communication device and a controller. The storage stores information identifying the electronic device. The controller, when starting connection of the electronic device with a first other electronic device, sends the information identifying the electronic device to a second other electronic device when the first other electronic device is connected to the second other electronic device, and connects the electronic device to the first other electronic device when a request for connection with the first other electronic device is received, the first other electronic device receiving the information identifying the electronic device from the second other electronic device.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

BRIEF DESCRIPTION OF THE DRAWINGS

FIG. 7 illustrates connection states between a master device and a slave device when switching connections according to the second embodiment;

FIG. 8 illustrates connection states between a master device and a slave device when switching connections according to the second embodiment;

FIG. 9 illustrates connection states between a master device and a slave device when switching connections according to the second embodiment;

FIG. 11 illustrates a connection master table according to the second embodiment;

DETAILED DESCRIPTION OF THE EMBODIMENTS

Embodiments of the present disclosure will be described in detail below with reference to the accompanying drawings.

First Embodiment

Figure 1:
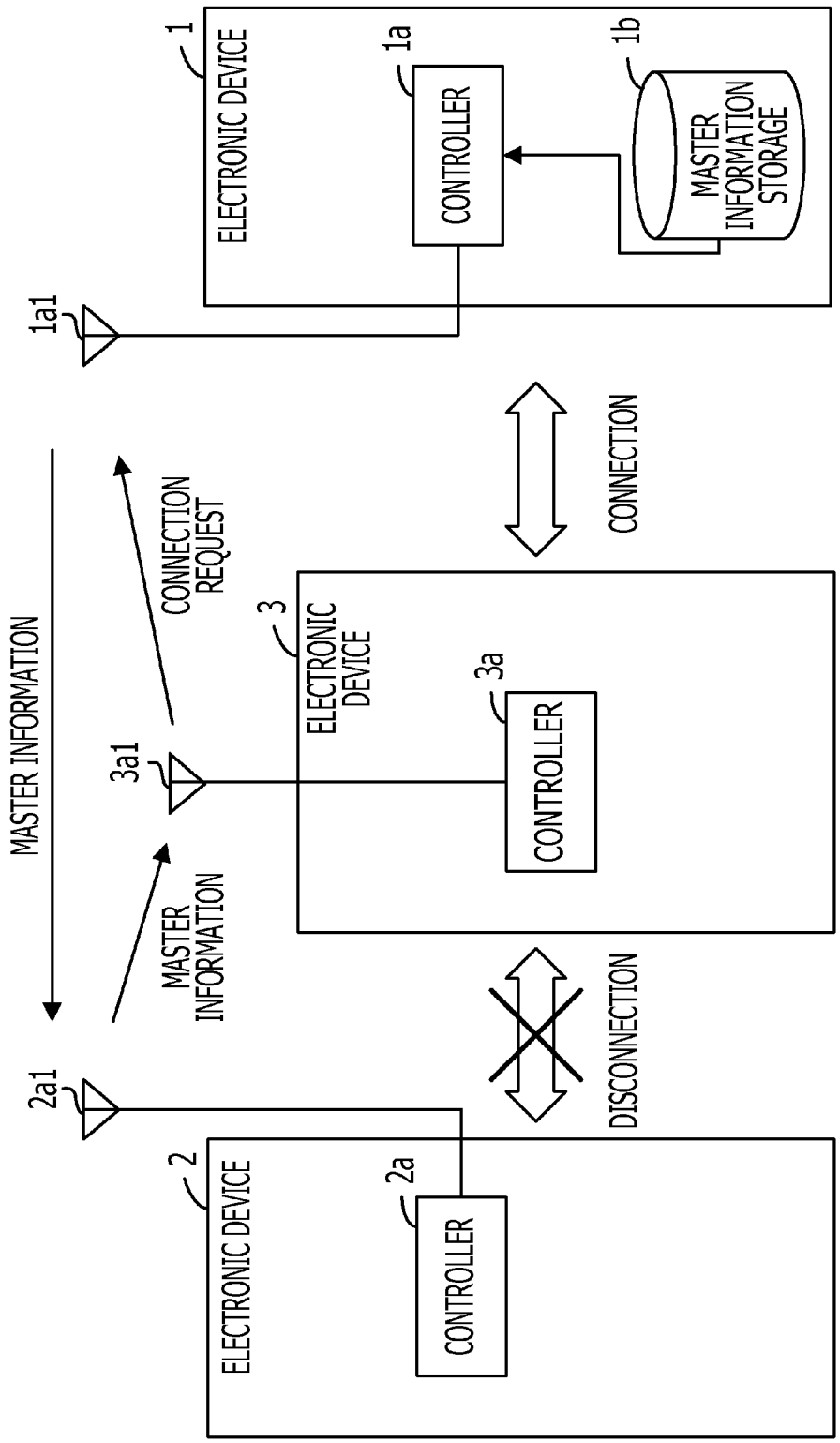
FIG. 1 illustrates electronic devices according to a first embodiment.

FIG. 1 illustrates electronic devices according to a first embodiment. For example, electronic devices 1, 2, and 3 according to the first embodiment may be electronic apparatuses such as mobile terminal devices, mobile telephones, mobile televisions, portable game devices, and electronic dictionaries; information processors such as notebook computers and personal digital assistants (PDAs); audio equipment such as earphones, speakers, and microphones; and peripheral devices such as printers, scanners, external memory devices, remote controllers, mice, keyboards, trackballs, digitizers, touch panels, and touch pens. In the example according to the present embodiment, the electronic devices 1 and 2 are master devices and the electronic device 3 is a slave device.

The electronic device 1 can be connected to the electronic device 3 with wireless communication. The electronic device 1 has a controller 1a, a master information storage 1b, and an antenna 1a1. The wireless communication may be, for example, short distance wireless communication such as Bluetooth or wireless LANs such as IEEE 802.11a, 802.11b, 802.11g, and 802.11n.

The controller 1a first sends a connection request to the electronic device 3 for connecting to the connection target electronic device 3. If the electronic device 3 is connected to the electronic device 2 and the response to the connection request is to refuse the connection, the controller 1a sends master information that is stored in the master information storage 1b to the electronic device 2. When the controller 1a receives a connection request from the electronic device 3 to connect to the electronic device 3, which has received the master information of the electronic device 1 from the electronic device 2, the controller 1a connects the electronic device 1 with the electronic device 3.

The master information storage 1b stores master information that identifies the electronic device 1. The master information may be information that can uniquely identify a device such as an address of a communication module of the electronic device 1. For example, this type of address is a Bluetooth address when conducting wireless communication using Bluetooth communication. The electronic devices 2 and 3 conduct wireless communication with the electronic device 1 using the master information. Moreover, the electronic devices 2 and 3 are each configured with master information in the same way. The electronic devices 1, 2, and 3 communicate and control wireless communication using the master information of the electronic devices 1, 2, and 3, respectively.

The antenna 1a1 is used to send and receive radio waves in wireless communication with other devices such as the electronic devices 2 and 3. The electronic device 2 can be connected to the electronic device 3 with wireless communication. The electronic device 2 has a controller 2a and an antenna 2a1.

When the controller 2a, while connected to the electronic device 3, receives the master information identifying the electronic device 1 sent from the electronic device 1, the controller 2a sends the master information sent from the electronic device 1 and a switching request to the electronic device 3. The switching request includes a request to disconnect the connection between the electronic device 3 and the electronic device 2 and includes a request to make a connection between the electronic device 3 and the electronic device 1.

The antenna 2a1 is used to send and receive radio waves in wireless communication with other devices such as the electronic devices 1 and 3. The electronic device 3 can be connected to the electronic devices 1 and 2 with wireless communication. The electronic device 3 has a controller 3a and an antenna 3a1.

When the controller 3a disconnects the connection between the electronic device 3 and the electronic device 2 after receiving the switching request from electronic device 2 that is connected to the electronic device 3, the controller 3a sends a connection request to request a connection with the electronic device 1, to the electronic device 1 according to the master information.

The antenna 3a1 is used to send and receive radio waves in wireless communication with other devices such as the electronic devices 1 and 2. The electronic device 1 may have the functions of the electronic device 2. Similarly, the electronic device 2 may have the functions of the electronic device 1.

The connection between the electronic device 2 and the electronic device 3 can be switched to a connection between the electronic device 1 and the electronic device 3 through the following operations of the abovementioned electronic devices 1, 2, and 3 according to the present embodiment.

When wireless communication with the electronic device 3 cannot be conducted, the controller 1a of the electronic device 1 sends the master information stored in the master information storage 1b to the electronic device 2. When the controller 2a of the electronic device 2 receives the master information identifying the electronic device 1 from the electronic device 1, the controller 2a sends the master information and a switching request to the electronic device 3 that is connected to the electronic device 2. When the controller 3a of the electronic device 3 receives the master information and the switching request from the electronic device 2 that is connected to the electronic device 3, the controller 3a disconnects the connection between the electronic device 3 and the electronic device 2 and then sends a connection request to connect with the electronic device 1, to the electronic device 1 according to the master information. Accordingly, the controller 1a receives the connection request to connect with the electronic device 3 sent from the electronic device 3, and then connects with the electronic device 3.

As a result, connection between the electronic device 1 or 2 that is master device and the electronic device 3 that is a slave device can be automatically switched by wireless communication based on the wireless communication system using the electronic devices 1, 2, and 3. Thus, the connection of the electronic device 3 can be easily switched from the connection with the electronic device 2 to a connection with the electronic device 1.

A following second embodiment uses information processors as an application example of the electronic devices 1 and 2 according to the first embodiment. Further, the second embodiment uses a headphone as an application example of the electronic device 3. However, as described above, the electronic devices 1 and 2 may be various electronic devices other than an information processor. Further, the electronic device 3 may be any type of electronic device besides a headphone.

Second Embodiment

Figure 2:
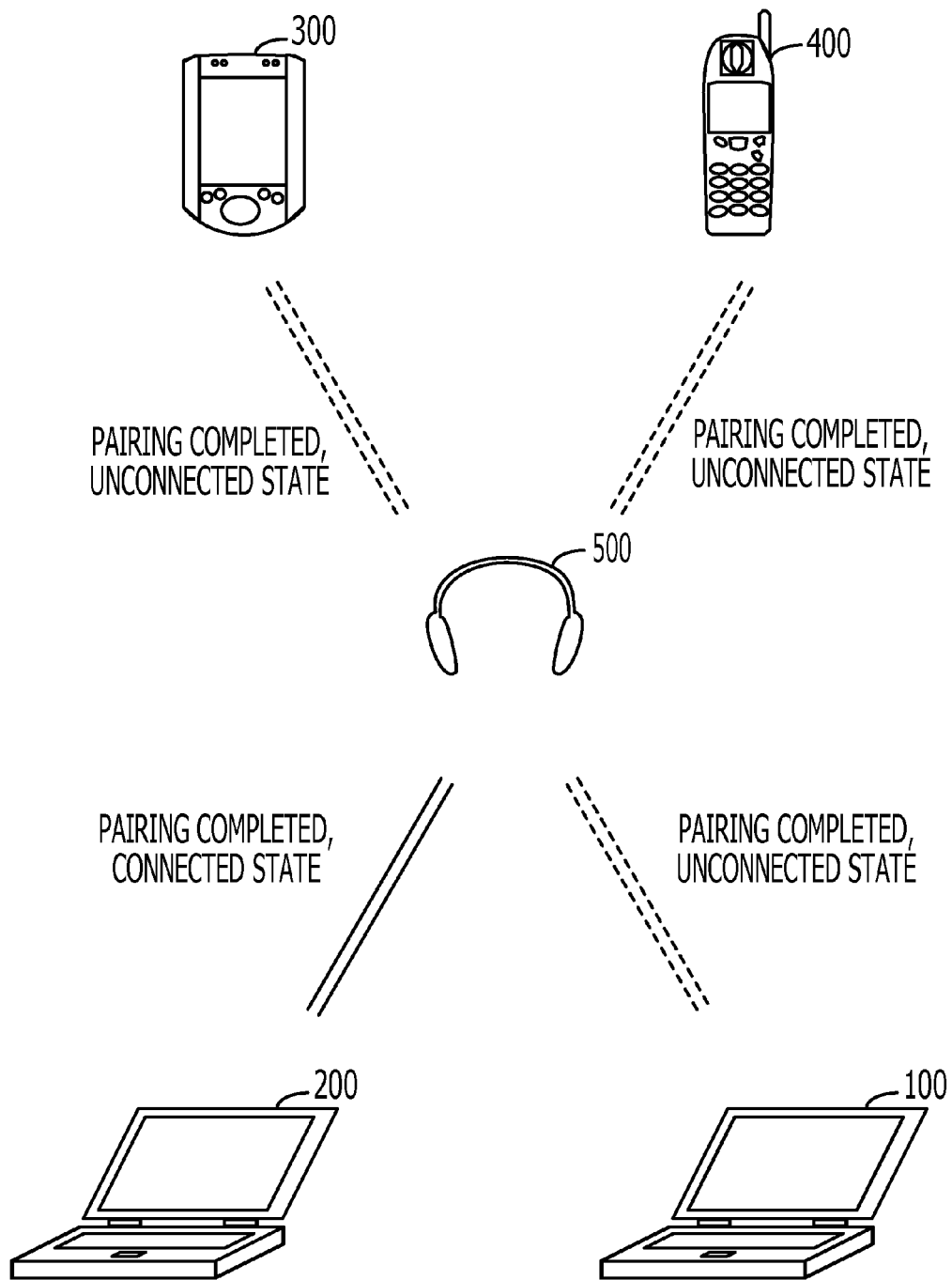
FIG. 2 illustrates a wireless communication system according to a second embodiment.

FIG. 2 illustrates a wireless communication system according to a second embodiment. In the wireless communication system of this embodiment, one of master devices, which are information processors 100 and 200, a music player 300, and a mobile phone 400, is connected with Bluetooth to a headphone 500 that represents a slave device. Although Bluetooth communication is used as an example of wireless communication in the present embodiment, the communication method is not limited to this and any short distance wireless communication such as IEEE 802.11a/b/g/n wireless LAN may be used.

The information processors 100 and 200, the music player 300, the mobile phone 400, and the headphone 500 have functions for wireless communication with Bluetooth so that data communication and connection control can be performed with Bluetooth between the master device and the slave device.

A connection setting called a "pairing" is desirably completed ahead of time between the master device and the slave device in Bluetooth wireless communication. In the present embodiment, the master devices, which are the information processors 100 and 200, the music player 300, and the mobile phone 400, have completed the pairing with the slave device, the headphone 500, as illustrated in FIG. 2.

Furthermore, the headphone 500, the slave device, is connected to one master device in the wireless communication system according to the present embodiment. In other words, when the headphone 500 is connected to a certain master device, it is not connected to another master device. To connect to another master device, the headphone 500 first disconnects the connection with the currently connected master device, and then connects to the other master device. For example, as illustrated in FIG. 2, for the information processor 100 to connect to the headphone 500 while the headphone 500 is connected to the information processor 200, the connection between the headphone 500 and the information processor 200 is disconnected and then the connection between the headphone 500 and the information processor 100 is conducted.

Figure 3:
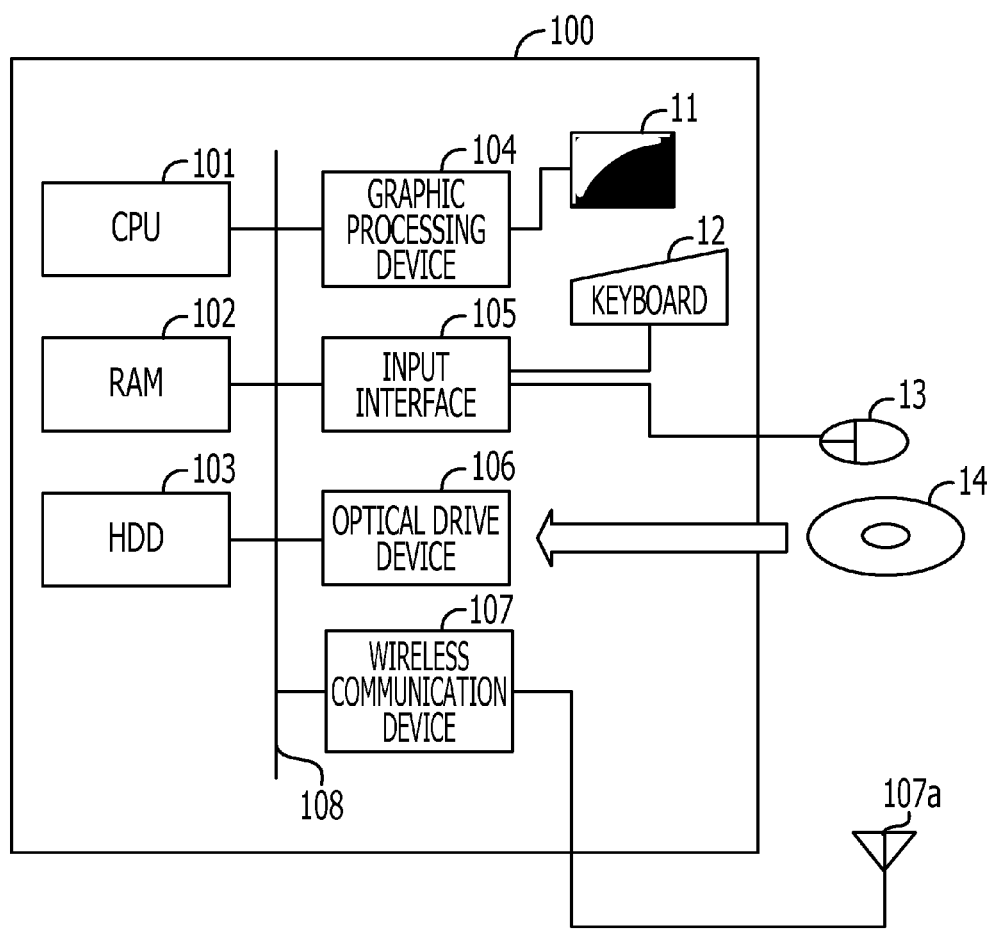
FIG. 3 illustrates hardware of an information processor according to the second embodiment.

FIG. 3 illustrates hardware of an information processor according to the second embodiment. A central processing unit (CPU) 101 controls all of the information processor 100. The CPU 101 is interconnected to a random access memory (RAM) 102 and multiple peripheral devices through a bus 108.

The RAM 102 is used as a main storage of the information processor 100. The RAM 102 temporarily stores at least portions of the operating system (OS) and application programs to be executed by the CPU 101. Furthermore, the RAM 102 stores various types of data for processing conducted by the CPU 101.

Examples of the peripheral devices connected to the bus 108 include a hard disk drive (HDD) 103, a graphic processing device 104, an input interface 105, an optical drive device 106, and a wireless communication device 107.

The HDD 103 conducts magnetic reading and writing of data on an internal disk. The HDD 103 is used as a secondary storage of the information processor 100. The HDD 103 stores application programs, operating systems, and various types of data. A semiconductor storage device such as a flash memory may be used as the secondary storage.

The graphic processing device 104 is connected to a monitor 11. The graphic processing device 104 displays images on a screen of the monitor 11 according to commands from the CPU 101. A display device with a cathode ray tube (CRT) and a liquid crystal display device are examples of the monitor 11.

The input interface 105 is connected to a keyboard 12 and a mouse 13. The input interface 105 sends signals received from the keyboard 12 or the mouse 13 to the CPU 101. The mouse 13 is an example of a pointing device. However, other pointing devices besides a mouse 13 may be used. Other examples of pointing devices include a touch panel, a tablet, a touch pad, and a track ball.

The optical drive 106 uses a laser beam and the like to read data recorded on an optical disk 14. The optical disk 14 is a portable recording medium with recorded data that can be read using optical reflection. Examples of the optical disk 14 include a digital versatile disk (DVD), a DVD-RAM, a compact disk read only memory (CD-ROM), and a CD-R (Recordable)/RW (Rewritable). The optical disk drive 106 may include a function to record data onto the optical disk 14.

The wireless communication device 107 is connected to an antenna 107a. The wireless communication device 107 controls wireless communication with other devices and sends and receives data through the antenna 107a. Communication using Bluetooth is an example of wireless communication.

Figure 4:
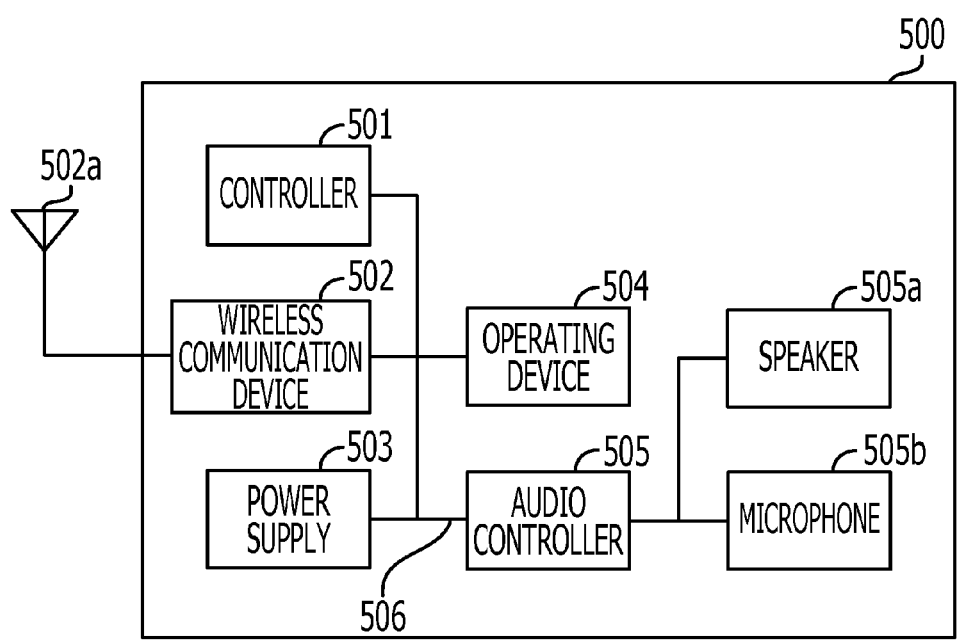
FIG. 4 illustrates hardware of a headphone according to the second embodiment.

FIG. 4 illustrates hardware of a headphone according to the second embodiment. The headphone 500 according to the second embodiment includes a controller 501, a wireless communication device 502, a power supply 503, an operating device 504, an audio controller 505, a speaker 505a, and a microphone 505b. The wireless communication device 502, the power supply 503, the operating device 504, and the audio controller 505 are all connected to the controller 501 through a bus 506. The speaker 505a and the microphone 505b are connected to the audio controller 505.

The controller 501 controls all of the headphone 500. The controller 501 may be implemented by, for example, a CPU, a RAM, a ROM, or a flash memory. The CPU reads programs and data from the ROM and loads the programs and data onto the RAM to conduct the programs. The RAM is a volatile memory that temporarily stores at least a portion of the programs and the data. Other types of memory may be used in place of the RAM. The ROM is a non-volatile memory that stores programs and data used by the controller 501. The flash memory is a non-volatile memory that is used to store programs and data when there is a desire to overwrite some of the programs and data used by the controller 501 and hold some or all of the programs and data when the power of the headphone 500 is off. Controls conducted by the controller 501 include communication control, voice input and output control, and key operation control.

The wireless communication device 502 is connected to an antenna 502a. The wireless communication device 502 sends and receives data to and from the master device via the antenna 502a in its wireless communication. The sending and receiving of data in this wireless communication are controlled by the master device.

The power supply 503 provides power to each section of the headphone 500 from a battery or an external power source. The operating device 504 receives power supply operations and input operations through operating buttons or operating keys on the headphone 500. The operating device 504 sends signals based on the received operations to the controller 501.

The audio controller 505 controls audio signals to be outputted to the speaker 505a or inputted from the microphone 505b. The speaker 505a outputs sound to the user wearing the headphone 500. The speaker 505a converts electric signals to physical vibrations to play sound according to the control of the audio controller 505. The microphone 505b receives sound, converts the physical vibrations of the sound to electric signals and outputs the signals to the audio controller 505.

Processing functions according to the present embodiment are implemented based on the hardware configuration described above. Although FIG. 3 illustrates the hardware configuration of the information processor 100, the other master devices including the information processor 200, the music player 300, and the mobile phone 400 may have similar hardware configurations.

Figure 5:
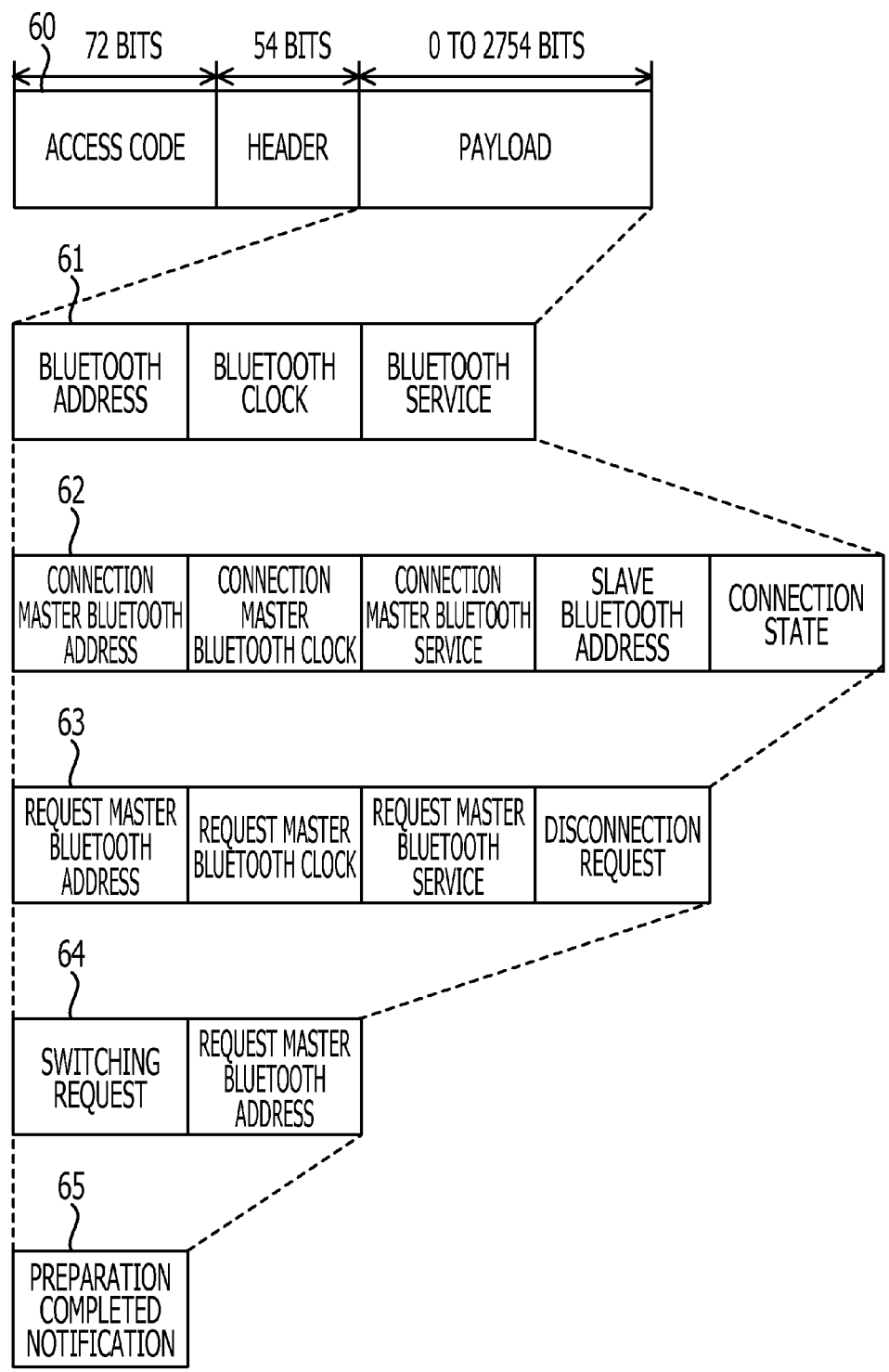
FIG. 5 illustrates a configuration of Bluetooth packet according to the second embodiment.

FIG. 5 illustrates a configuration of Bluetooth packets according to the second embodiment. According to the wireless communication system of the present embodiment, the Bluetooth packets illustrated in FIG. 5 are sent and received between the information processors 100 and 200, the music player 300, the mobile phone 400, and the headphone 500. As a result, wireless communication connection control and data communication can be performed.

A Bluetooth packet 60 illustrated in FIG. 5 includes a 72-bit access code, a 54-bit packet header, and a 0 to 2754-bit variable length payload. The wireless communication system according to the present embodiment performs data communication using the Bluetooth packet 60.

A normal frequency hop synchronization (FHS) packet payload 61 is transmitted between the master device and the slave device when wireless communication is established using normal Bluetooth. The payload 61 indicates a Bluetooth address and a clock used during wireless communication. The normal FHS packet payload 61 includes the Bluetooth address, a Bluetooth clock, and a Bluetooth service. The Bluetooth address indicates an address that specifies the sending device. The Bluetooth clock indicates the clock used in the Bluetooth wireless communication. The Bluetooth service indicates the function provided by the Bluetooth wireless communication.

When connection slave information is to be transmitted, a payload 62 transmits connection state information, which indicates the slave device, to the master device (the information processor 100) requesting connection to the slave device, from the master device (the information processor 200) currently connected to the slave device (the headphone 500). The payload 62 includes a connection master Bluetooth address, a connection master Bluetooth clock, and a connection master Bluetooth service. The connection master Bluetooth address indicates the Bluetooth address of the master device currently connected to the slave device. The connection master Bluetooth clock indicates the Bluetooth clock of the master device currently connected to the slave device. The connection master Bluetooth service indicates the Bluetooth service of the master device currently connected to the slave device. The payload 62 includes a slave Bluetooth address and connection state information. The slave Bluetooth address indicates a Bluetooth address of the slave device currently connected thereto. The connection state information indicates the state of the communication with the slave device. The connection state information of the payload 62 functions as connection slave information which will be described below with reference to FIG. 6.

When a disconnection request is to be transmitted, a payload 63 sends a request for disconnection of the slave device from the master device (the information processor 200) currently connected thereto. The request is sent to the slave device (the headphone 500) from the master device (the information processor 100) requesting connection. The payload 63 includes a request master Bluetooth address, a request master Bluetooth clock, and a request master Bluetooth service. The request master Bluetooth address indicates the Bluetooth address of the master device requesting connection to the slave device. The request master Bluetooth clock indicates the Bluetooth clock of the master device requesting connection to the slave device. The request master Bluetooth service indicates the Bluetooth service of the master device requesting connection to the slave device. The payload 63 also includes a request for disconnection of the slave device from the master device currently connected to the slave device. The request master Bluetooth address of the disconnection request transmission time payload 63 functions as master information which will be described below with reference to FIG. 6.

When switching is to be requested, a payload 64 transmits a request for disconnection of the current connection and switching of the connection to the master device requesting connection to the slave device. The request is sent to the slave device from the master device currently connected thereto. The payload 64 includes the switching request and the request master Bluetooth address. The switching request is a request to disconnect the current connection and switch to a connection with the master device requesting connection, to the slave device from the master device currently connected to the slave device. The request master Bluetooth address indicates the Bluetooth address of the master device requesting connection to the slave device. The request master Bluetooth address of the payload 64 functions as master information which will be described below with reference to FIG. 6.

When a preparation completed notification is to be transmitted, a payload 65 transmits a notification that notifies the master device currently connected to the slave device that the preparation to disconnect the current connection and connect to the master device requesting connection has been completed.

The abovementioned packets may have various data configurations. For example, information other than that described in the present embodiment may be added to the data configurations of the packets. Conversely, portions of the information described in the present embodiment may be omitted.

Figure 6:
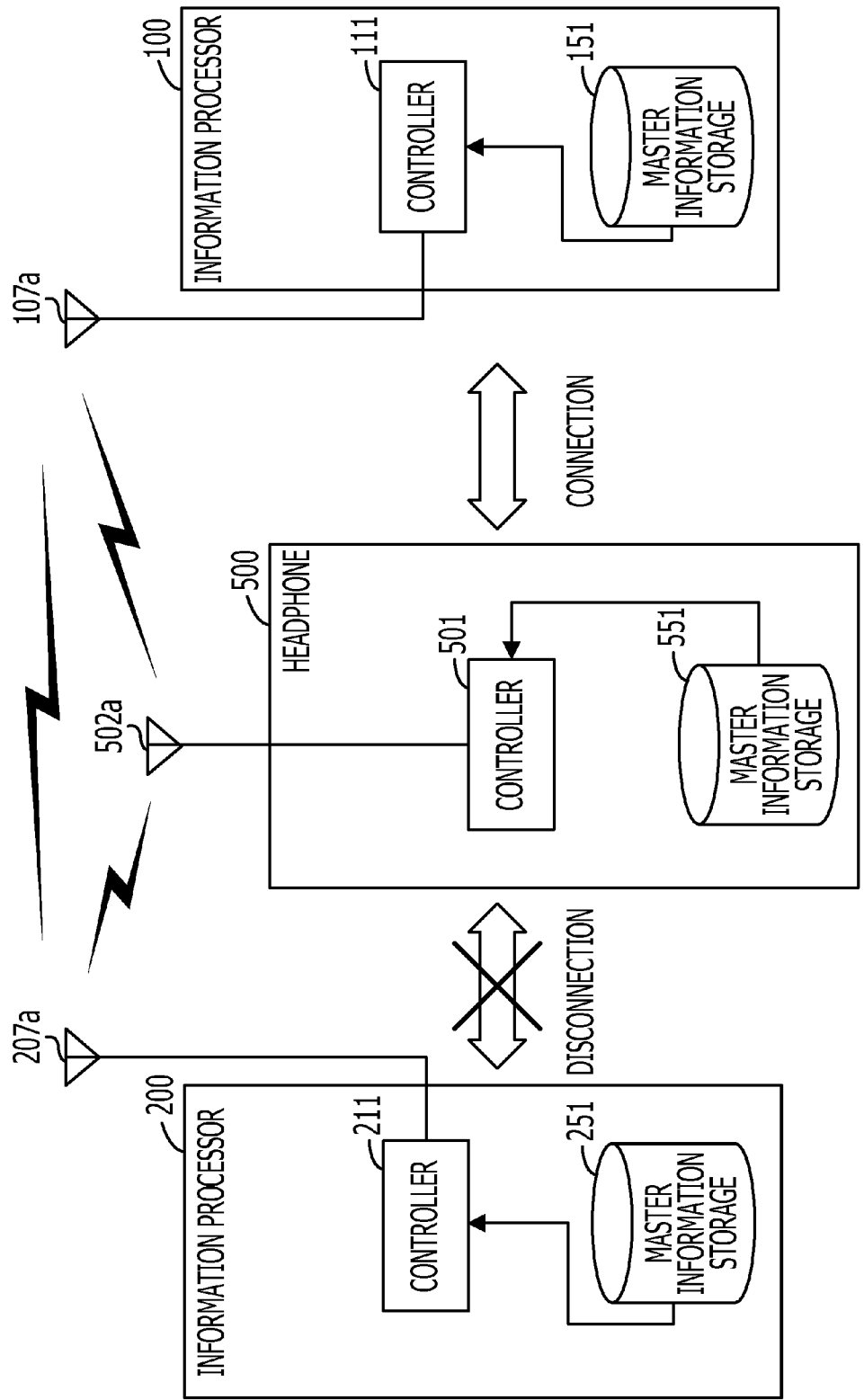
FIG. 6 is a block diagram of functions of an information processor and a headphone according to the second embodiment.

FIG. 6 is a block diagram of functions of an information processor and a headphone according to a second embodiment. In the wireless communication system of the present embodiment, one of the information processors 100 and 200 is exclusively connected to the headphone 500.

The information processor 100 can be connected to the headphone 500 through wireless communication using Bluetooth. The information processor 100 has a controller 111, a master information storage 151, and an antenna 107a.

The controller 111 first sends a connection request to a target headphone 500 to be connected. The controller 111 sends a connection slave information request that checks the state of connection with the headphone 500 to all the master devices without specifying the target master device if the controller 111 receives a connection refusal from the headphone 500 concerning the connection request. Connection slave information indicates whether or not the connection between the headphone 500 and another master device (in this example, the information processor 200) can be switched in regard to the connection between the headphone 500 and the master device currently connected thereto. The master devices receive the connection slave information request. The master device connected to the headphone 500, which is the object of the connection request sent from the information processor 100, sends the connection slave information indicating the state of the communication connection with the headphone 500 to the information processor 100.

Next, the controller 111 receives the connection slave information sent from the information processor 200 connected to the headphone 500. The controller 111 sends a disconnection request to the information processor 200 to request disconnection of the connection with the headphone 500 when the state of the connection in the received connection slave information indicates that the connection can be switched to a connection between the headphone 500 and the information processor 100. The controller 111 adds master information stored in the master information storage 151 to the disconnection request at this time. The information processor 200 that receives the disconnection request sends the master information added to the disconnection request to the headphone 500.

The controller 111 is then connected to the headphone 500 when the request for connection with the headphone 500 is received from the headphone 500. The request for connection with the headphone 500 is sent from the headphone 500 that has received the master information of the information processor 100 sent from the information processor 200.

The controller 111 has the same function as the controller 211 to be described below. As a result, the information processor 100 receives the switching request for switching the connection with the headphone 500 from the other master device such as the information processor 200, and switches the connection according to the request.

The master information storage 151 stores master information that identifies the electronic device 100. The master information may be, for example, a Bluetooth address of the information processor 100. The information processor 200 and the headphone 500 conduct wireless communication with the information processor 100 using the master information. Furthermore, the information processor 200 and the headphone 500 may be set in the same way with master information. The information processors 100 and 200 and the headphone 500 conduct communication and control of the wireless communication using the master information of the information processors 100 and 200 and the headphone 500.

The antenna 107a is used to transmit radio waves for wireless communication between the information processor 200 and the headphone 500. The information processor 200 can be connected to the headphone 500 through wireless communication. The information processor 200 has a controller 211, master information storage 251, and an antenna 207a.

When connected to the headphone 500, the controller 211 first sends the connection slave information that indicates whether or not the state of the connection with the headphone 500 can be switched to the connection with the information processor 100, to the information processor 100 when the connection slave information request is received from the information processor 100. The connection slave information request at this time is a request to send the connection slave information indicating whether or not the connection can be switched to a connection between the headphone 500 and the information processor 100.

The controller 211 then sends the switching request to the headphone 500. The switching request at this time is a request to disconnect the connection between the headphone 500 and the information processor 200 and make a connection between the headphone 500 and the information processor 100. The controller 211 adds the master information sent from the information processor 100 for the headphone 500 to the switching request at this time.

Conversely, the controller 211 does not send the connection slave information to the information processor 100 if the controller 211 is not connected to the headphone 500 when the controller 211 receives the connection slave information request from the information processor 100.

The controller 211 has the same functions as the above-mentioned controller 111. As a result, the information processor 200 requests switching the connection to the other master device when the headphone 500 is to be connected to another master device such as the information processor 100.

The master information storage 251 stores master information that identifies the electronic device 200 in the same way as the master information storage 151. The antenna 207a is used to transmit radio waves for wireless communication with the information processor 100 and the headphone 500.

The headphone 500 can be connected to the information processors 100 and 200 through wireless communication. The headphone 500 includes a controller 501, a master information storage 551, and an antenna 502a.

The controller 501 sends a connection request to the information processor 100 to request connection with the information processor 100 based on the master information that identifies the information processor 100 and included in the switching request, when the disconnection of the connection between the headphone 500 and the information processor 200 has been completed after receiving the switching request sent from the information processor 200.

The antenna 502a is used to transmit radio waves for wireless communication with the information processor 200 and the information processor 100. The master information storage 551 stores connection master information as described with reference to FIGS. 11 and 12 below. The connection master information indicates a priority ranking for connections of the master devices that have completed the pairing with the headphone 500. The connection master information is set in a connection master table in association with the priority ranking of the communication connections. The headphone 500 controls connections with the master devices according to the connection master table.

FIG. 6 illustrates the switching and connecting between one slave device represented by the headphone 500 and two master devices represented by the information processors 100 and 200. However, the configuration is not limited to the above and one slave device may be switched and connected to three or more master devices. Moreover, two or more slave devices may be switched and connected to two or more master devices.

FIGS. 7 to 9 illustrate connection states between a master device and a slave device when switching connections according to the second embodiment. FIG. 7 illustrates a state in which a master 2 (e.g., the information processor 200) that is one of the master devices is connected with a slave (e.g., the headphone 500) that is a slave device, and the master 2 and the slave are communicating with each other. FIG. 7 illustrates the connection states of the slave with the master devices including a master 1 (e.g., the information processor 100), the master 2, a master 3 (e.g., the music player 300), and a master 4 (e.g., the mobile telephone 400). All the states illustrated in FIGS. 7 to 9 are states in which the pairings between the master devices and the slave device have been completed.

The "Pairing Completed" column in FIG. 7 indicates a state of the master devices and the slave device, which are to be paired. An "o" indicates that the pairing is completed and an "x" indicates not completed yet. The "Connected" column indicates a state of the master devices and the slave device, which are to be connected. An "o" indicates that the devices are connected and an "x" indicates not connected. The "Communicating" column indicates a state of the master device and the slave device, which are to communicate each other. An "o" indicates that the devices are in communication state and an "x" indicates a non-communication state.

In other words, the master 2 is connected to and communicating with the slave as illustrated in FIG. 7. Conversely, the other masters 1, 3, and 4 are neither connected to nor communicating with the slave. Furthermore, the masters 1 to 4 have completed pairing with the slave as described above.

When the slave device and the master device connected to the slave device are communicating, the master device connected to the slave device refuses to disconnect communication even when a request to switch connection is received from another master device. The master device connected to the slave device conducts switching of the connection according to a request from another master device when communication is finished and the connection state moves from a communicating state to a connected but not communicating state. Since the master 2 is communicating with the slave as indicated in the state in FIG. 7, the master 2 refuses to disconnect the connection even if the other masters 1, 3, or 4 send a connection request. As a result, the other masters 1, 3, and 4 cannot connect to the slave.

FIG. 8 illustrates states in which the master 2 and the slave are connected but are not communicating with each other. Although the master 2 is connected to the slave as illustrated in FIG. 8, the master 2 is not communicating with the slave. The other masters 1, 3, and 4 are neither connected to nor communicating with the slave. Furthermore, the masters 1 to 4 have completed pairing with the slave as described above.

In the state illustrated in FIG. 8, since the master 2 is not communicating with the slave, the master 2 disconnects the connection with the slave after receiving a connection request from another master (e.g., the master 1) and requests the slave to switch the connection to permit a connection with another master that sends the connection request. As a result, the other masters can be connected to the slave.

FIG. 9 illustrates states in which the connection between the master 2 and the slave is disconnected, and the master 1 and the slave are connected and conducting communication. The master 1 is connected to the slave as illustrated in FIG. 9, and the master 1 is communicating with the slave. Conversely, the other masters 2 to 4 are not connected to the slave and are not communicating with the slave. Furthermore, the masters 1 to 4 have completed pairing with the slave as described above.

The state illustrated in FIG. 9 indicates the state in which the master 1 and the slave are connected and communicating and also indicates that the connection illustrated in FIG. 8 between the master 2 and the slave is disconnected.

Figure 10:
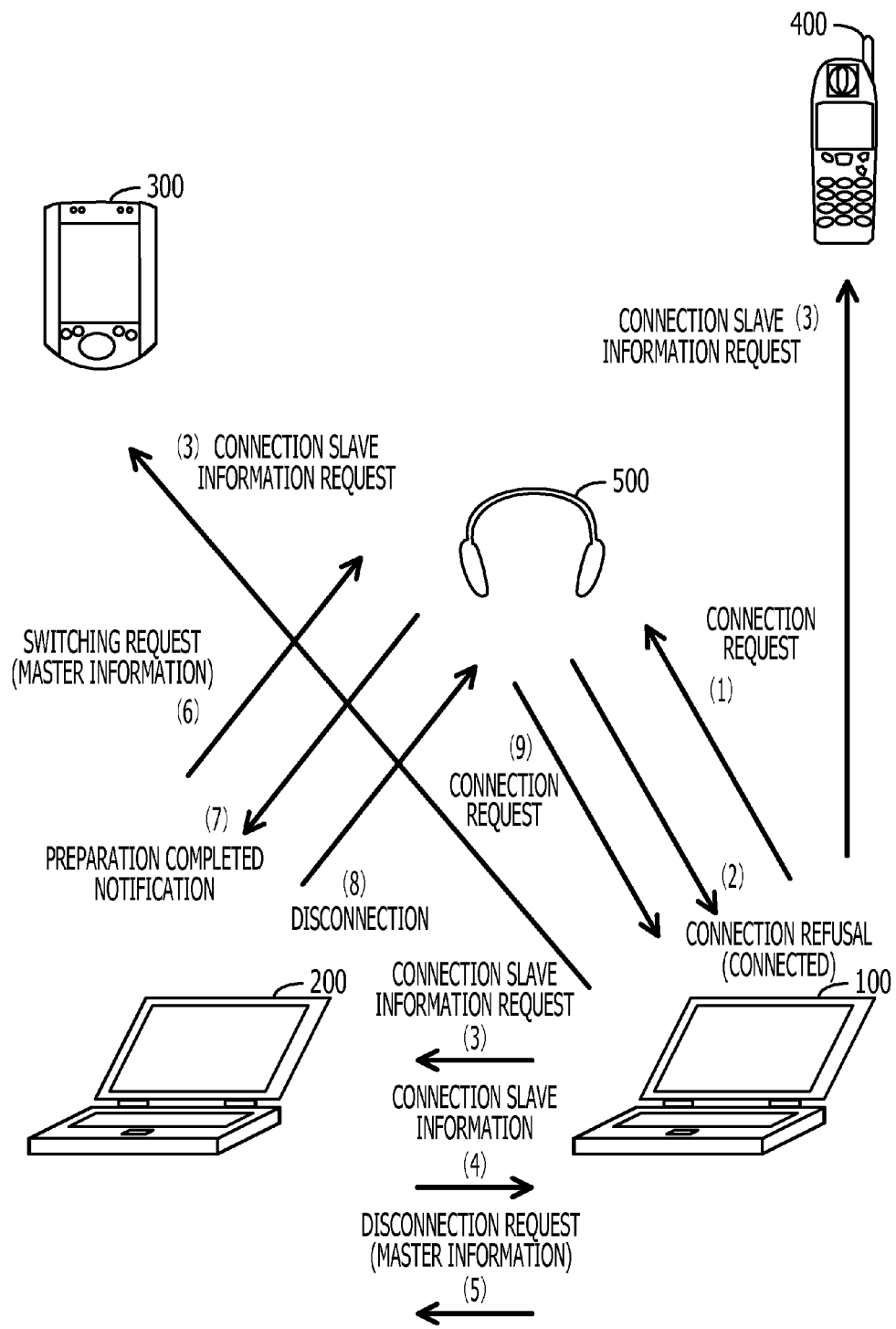
FIG. 10 illustrates procedures when making connections in a wireless communication system according to the second embodiment.

FIG. 10 illustrates procedures when performing connections in the wireless communication system according to the second embodiment. The wireless communication system of the present embodiment as illustrated in FIG. 10 conducts communication between devices using Bluetooth and can switch master devices connected to the slave device according to a connection request from a master device. The following explanation will discuss processing, with respect to FIG. 10, for connecting the headphone 500 and the information processor 100 due to a connection request from the information processor 100 when the headphone 500 is connected to the information processor 200.

The information processor 100 sends a connection request to the headphone 500 that is the connection target ((1) in FIG. 10). The headphone 500 sends a connection refusal to the information processor 100 in response to the connection request from the information processor 100 because the headphone 500 is connected to the information processor 200 through Bluetooth communication ((2) in FIG. 10).

The information processor 100 sends a connection slave information request to the other master devices upon receiving the connection refusal from the headphone 500 ((3) in FIG. 10). As described above, the connection slave information request is a request for a response and a notification of the connection state from the master device connected to the headphone 500.

The information processor 200, the music player 300 and the mobile phone 400 receive the connection slave information request from the information processor 100 and then the device that is connected to the headphone 500 sends connection slave information to the information processor 100 ((4) in FIG. 10). In FIG. 10, the information processor 200 sends the connection slave information to the information processor 100 since the information processor 200 is connected to the headphone 500. Conversely, the music player 300 and the mobile phone 400 do not respond to the connection slave information request from the information processor 100 since the music player 300 and the mobile phone 400 are not connected to the headphone 500.

The information processor 100 receives the connection slave information from the information processor 200 and sends a disconnection request to the information processor 200 ((5) in FIG. 10). The disconnection request includes a request master Bluetooth address (master address) that identifies the information processor 100.

The information processor 200 receives the disconnection request from the information processor 100, and sends a switching request to the headphone 500 to request a connection between the headphone 500 and the information processor 100 if the information processor 200 is to disconnect the connection between itself and the headphone 500 ((6) in FIG. 10). The switching request includes master information of the information processor 100 that requests the switching of the connection. As a result, the master information of the information processor 100 is sent by the information processor 200 to the headphone 500. The request master information may also be sent separately from the switching request to the headphone 500 by the information processor 200. Alternatively, the information processor 200 sends a disconnection refusal to the information processor 100 if the information processor 200 will not disconnect the connection with the headphone 500 due to ongoing communication with the headphone 500 and the like.

If the headphone 500 receives the request master information and the switching request from the information processor 200, the headphone 500 sends a preparation completed notification to the information processor 200 when the preparations for disconnecting with the information processor 200 and connecting with the information processor 100 are completed ((7) in FIG. 10).

The information processor 200 receives the preparation completed notification from the headphone 500 and disconnects the connection with the headphone 500 ((8) in FIG. 10). The headphone 500 sends a connection request to the information processor 100 after the connection between the headphone 500 and the information processor 200 is disconnected ((9) in FIG. 10). The information processor 100 receives the connection request from the headphone 500 and connects with the headphone 500. As a result, the connection between the information processor 200 and the headphone 500 is disconnected and switched to a connection between the information processor 100 and the headphone 500.

Figure 12:
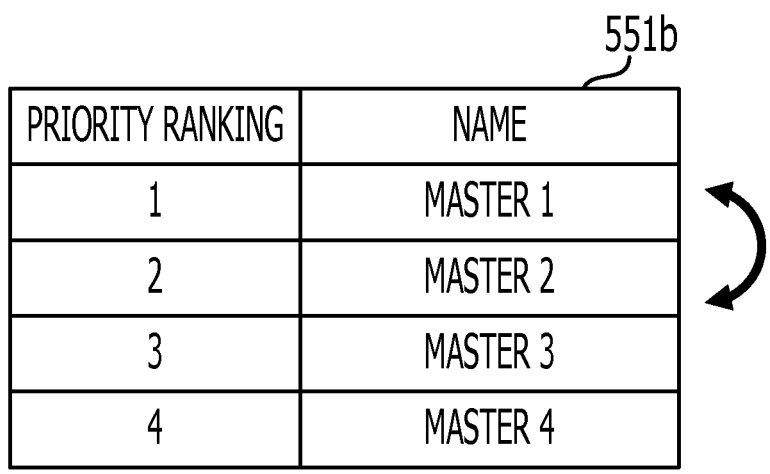
FIG. 12 illustrates a connection master table according to the second embodiment.

FIGS. 11 and 12 illustrate connection master tables according to the second embodiment. Connection master tables 551a and 551b illustrated in FIGS. 11 and 12 respectively are made and controlled by the controller 501. Moreover, the connection master tables 551a and 551b are stored in a flash memory that functions as the master information storage 551 of the controller 501. The connection master tables 551a and 551b are tables that store the connection master information that indicates a priority ranking for connections of the master devices that have completed the pairing with the headphone 500.

The connection master tables 551a and 551b include "priority ranking" and "name" items. The information in each item is associated with each other to constitute the connection master information. The priority ranking is a value that indicates the priority ranking of the master devices that have completed the pairing. Master devices with lower priority ranking values are given priority for connecting to the slave device. The "name" item is the name that can uniquely identify the master devices that have completed the pairing.

The headphone 500 configures the connection master information of the paired master devices in the connection master table 551a when pairing with the master devices occurs. Moreover, the headphone 500 changes the order of the connection master information in the connection master tables 551a and 551b so that the priority ranking of the connection target master device is "1" (highest priority) when connecting with a master device. For example, when the headphone 500 is connected to the master 2 as illustrated in FIG. 11, the connection master table 551a sets the master 2 to the priority ranking 1. When the connection target of the headphone 500 changes from the master 2 (e.g., information processor 200) to the master 1 (e.g., information processor 100) due to the slave side connection response processing, the priority ranking of the connection master information is changed and master 1 is indicated as the priority ranking 1 of the connection master table 551b as illustrated in FIG. 12. The connection to the master device by the headphone 500 is conducted according to the slave side connection response processing, or according to an instruction by a user, and the like.

The headphone 500 attempts to connect to the master device with the highest priority ranking based on the connection master information when the power of the headphone 500 is turned on. The headphone 500 attempts to connect to each of the master devices according to the priority ranking if the connection to the master device with the highest priority ranking fails.

Moreover, the headphone 500 specifies the master device that sent the switching request based on the master information included in the switching request. The headphone 500 checks the specified master device using the connection master information stored in the connection master table. The headphone 500 does not conduct communication connection if the master device that sent the switching request is not set in the connection master table as a result of the checking. Thus, a connection with an improper master device that has not completed the pairing can be prevented.

Figure 13:
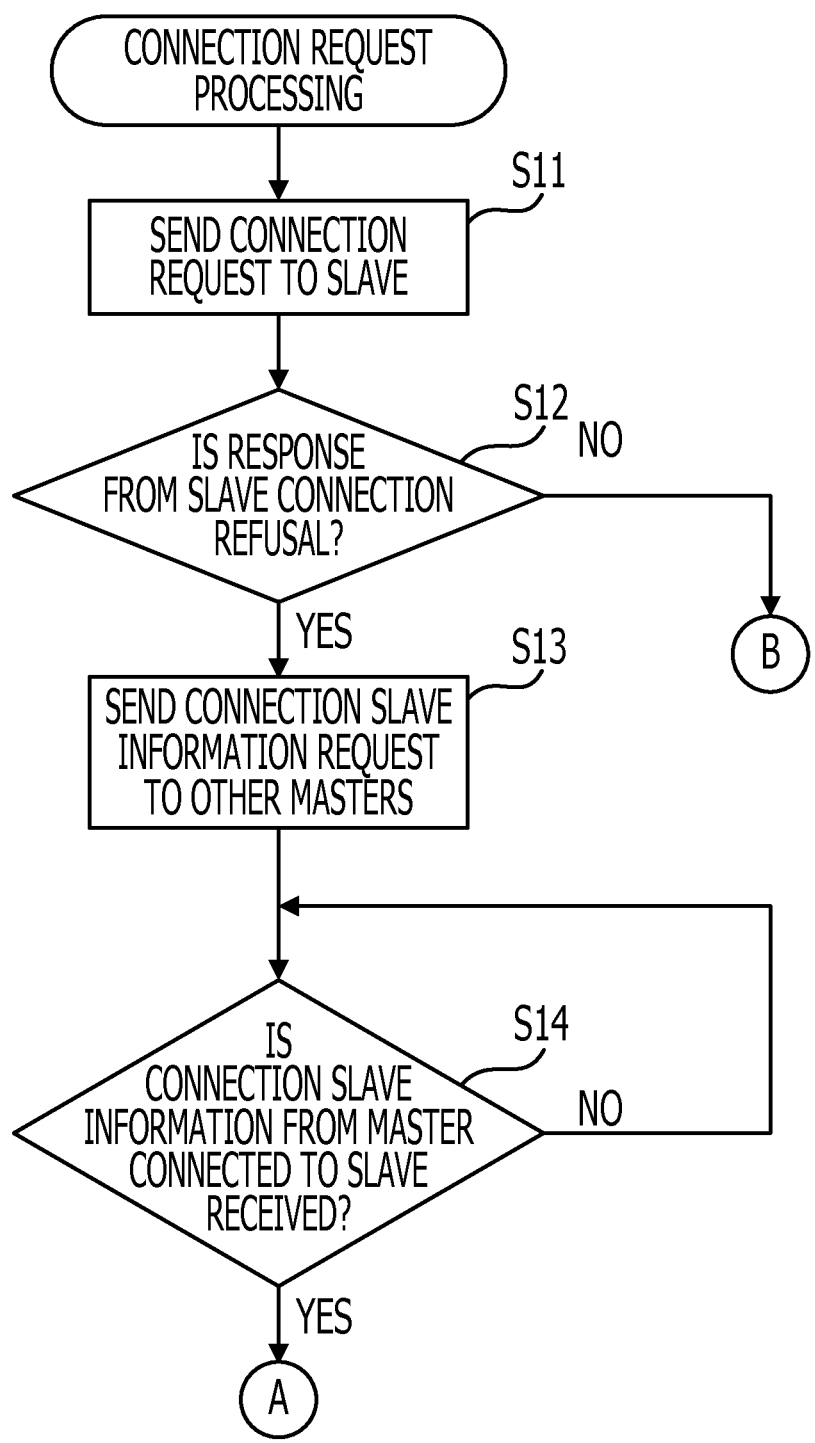
FIG. 13 is a flow chart illustrating connection request processing according to the second embodiment.
Figure 14:
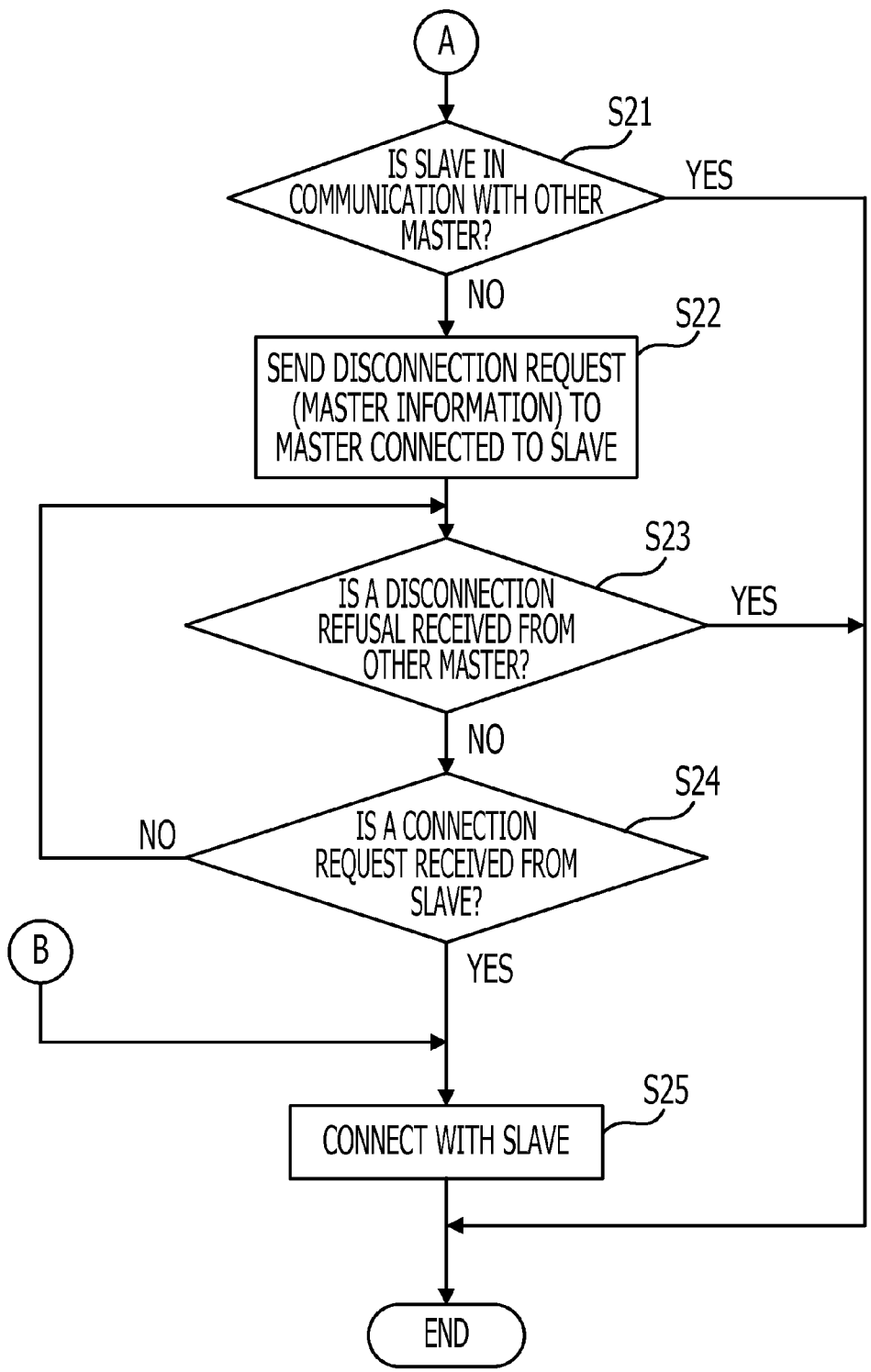
FIG. 14 is a flow chart illustrating connection request processing according to the second embodiment.

FIGS. 13 and 14 represent a flow chart illustrating connection request processing according to the second embodiment. The connection request processing is processing to connect the master device and the slave device. The connection request processing illustrated in FIGS. 13 and 14 will be described below with flowchart process numbers. The slave device is the headphone 500 in the following example. Further, the headphone 500 is connected to the information processor 200 as one master device before the processing starts in the following example. The connection request processing is conducted when connecting the master device and the slave device.

(Operation S11) The controller 111 of the information processor 100 sends a connection request to the headphone 500 that is the slave device.

(Operation S12) The controller 111 receives a response from the headphone 500 regarding the connection request and checks the contents of the response. If the response is a connection refusal (Operation S12: YES), the processing advances to Operation S13. Conversely, if the contents of the response are not a connection refusal (Operation S12: NO), the processing advances to Operation S25 (FIG. 14). The connection refusal response is caused by the fact that the headphone 500 is connected to another master device and are thus in use.

(Operation S13) The controller 111 sends master information that indicates itself (in this case, the information processor 100) and a connection slave information request to the other master devices that may be connected to the headphone 500 without specifying a sending destination. The other master devices, for example, are the information processor 200, the music player 300, and the mobile phone 400. The connection slave information request is a request for the master device connected to the headphone 500 to indicate the state of the connection with the headphone 500. The information processor 200 receives the connection slave information request from the information processor 100 and sends connection slave information indicating the state of the connection between the information processor 200 and the headphone 500 to the information processor 100 if the information processor 200 is connected to the headphone 500. The connection slave information includes information indicating whether or not the headphone 500 is in communication with the information processor 200. If the headphone 500 is in communication with the information processor 200, the information processor 200 cannot disconnect the connection with the headphone 500 and is in a state to refuse switching the connection.

(Operation S14) The controller 111 determines whether or not the controller 111 has received the connection slave information of the headphone 500 from the information processor 200. If the connection slave information has been received (Operation S14: YES), the processing advances to Operation S21 (FIG. 14). Conversely, if the connection slave information has not been received (Operation S14: NO), the processing of Operation 14 is repeated.

(Operation S21) The controller 111 determines whether or not the headphone 500 is in communication with the information processor 200 based on the connection slave information. If the headphone 500 and the information processor 200 are in communication (Operation S21: YES), the information processor 100 are not connected to the headphone 500 and the processing is finished. Conversely, if the headphone 500 and the information processor 200 are not in communication (Operation S21: NO), the processing advances to Operation S22.

(Operation S22) The controller 111 sends a disconnection request to request disconnection with the headphone 500, to the information processor 200. The controller 111 adds master information that identifies the information processor 100 and that is stored in the master information storage 151, to the disconnection request at this time.

(Operation S23) The controller 111 checks the response to the disconnection request. When a disconnection refusal that refuses the disconnection with the headphone 500 is received as the contents of the response (Operation S23: YES), the information processor 100 cannot be connected to the headphone 500 and the processing is finished. Conversely, if the contents of the response are not a connection refusal (Operation S23: NO), the processing advances to Operation S24.

(Operation S24) The controller 111 determines whether or not the connection request to request connection for communication with the information processor 100 has been received from the headphone 500. If the connection request has been received (Operation S24: YES), the processing advances to Operation S25. Conversely, if the connection request is not received (Operation S24: NO), the processing returns to Operation S23.

(Operation S25) The controller 111 connects the communication with the headphone 500. Then the processing is completed.

Figure 15:
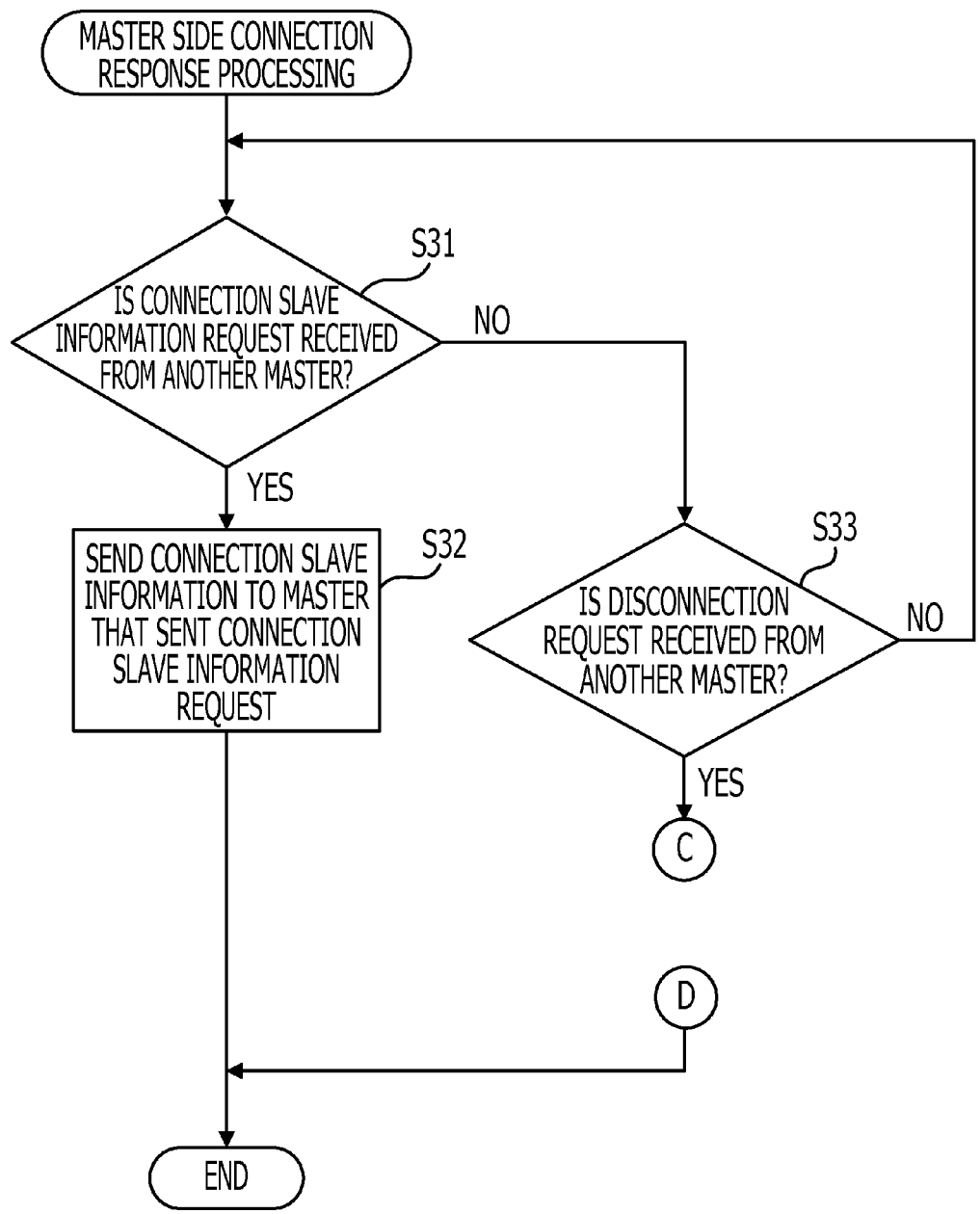
FIG. 15 is a flow chart illustrating master side connection response processing according to the second embodiment.
Figure 16:
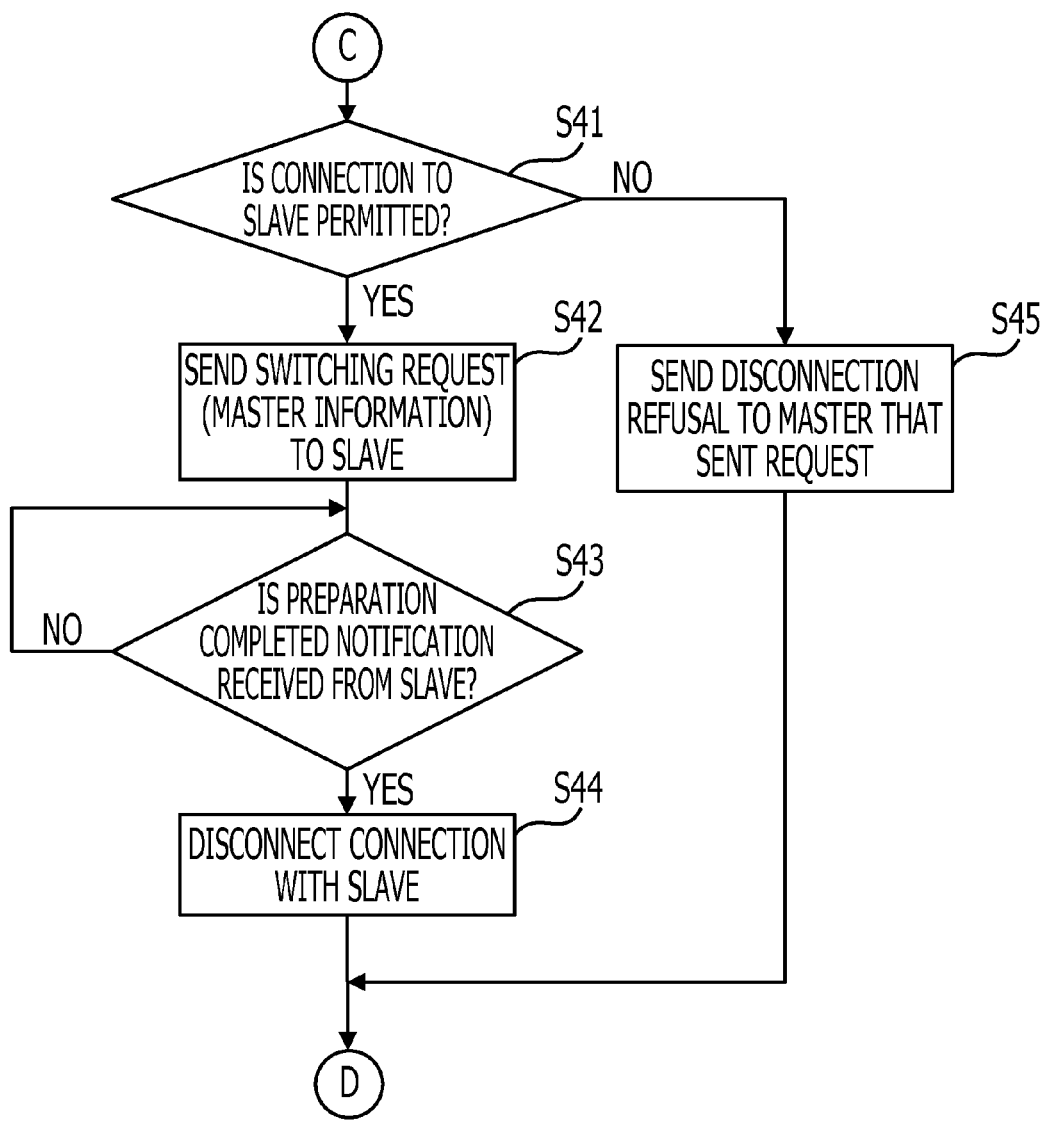
FIG. 16 is a flow chart illustrating master side connection response processing according to the second embodiment.

FIGS. 15 and 16 represent a flow chart illustrating master side connection response processing according to the second embodiment. In the master side response processing, the master device connected to the slave device disconnects the connection with the slave device in response to a request from another master device, and then the slave device is connected to the other master device. The master side connection response processing is conducted continually or periodically in the master device connected to the slave device. The master side connection response processing illustrated in FIGS. 15 and 16 will be described below with flowchart process numbers. In the following example, the slave device is the headphone 500 and the master device connected to the slave device is the information processor 200 as described above. Further, in the following example, the headphone 500 is connected to the information processor 200 and the information processor 100 is requesting connection for communication with the headphone 500.

(Operation S31) The controller 211 of the information processor 200 determines whether or not a connection slave information request has been received from another master device (e.g., the information processor 100). The connection slave information request is a request to report the connection state of communication with the headphone 500. If the connection slave information request has been received (Operation S31: YES), the processing advances to Operation S32. Conversely, if the connection slave information request is not received (Operation S31: NO), the processing returns to Operation S33.

The master device connected to the slave device does not send connection slave information of any slave device if a connection slave information of a slave device that is not connected to the master device is received.

For example, it can be assumed that multiple types of slave devices exist at the same time (e.g., the headphone 500 and speakers (not shown)). Then, the information processor 200 connected to the headphone 500 receives a connection slave information request that requests a communication connection state with the speakers from the music player 300 that is requesting connection with the speakers. In this case, the information processor 200 does not send any connection slave information concerning the headphone 500 or the speakers in response to the connection slave information request from the music player 300. However, in this case, if the information processor 200 receives a connection slave information request regarding the headphone 500, the information processor 200 sends the connection slave information regarding the headphone 500 to the information processor 100.

(Operation S32) The controller 211 sends the connection slave information indicating whether or not the information processor 200 is in communication with the headphone 500 that is the connection target, to the information processor 100. Then the processing is completed.

(Operation S33) The controller 211 determines whether or not the disconnection request that requests disconnection with the headphone 500 is received from another master device such as the information processor 100. If the disconnection request has been received (Operation S33: YES), the processing advances to Operation S41 (FIG. 16). If the disconnection request has not been received (Operation S33: NO), the processing returns to Operation S31. As described above, the disconnection request includes master information of the information processor 100 that requests switching the connection with the headphone 500.

(Operation S41) The controller 211 determines whether or not disconnection of the connection between the information processor 200 and the headphone 500 is permitted. If the disconnection with the headphone 500 is permitted (Operation S41: YES), the processing advances to Operation S42. Conversely, if the disconnection of the connection with the headphone 500 is not permitted when the information processor 200 is in communication with the headphone 500 or communication is to be connected and the like (Operation S41: NO), the processing advances to Operation S45.

(Operation S42) The controller 211 sends a switching request to the headphone 500. The switching request includes connection master information identifying the information processor 100. The switching request also requests switching the connection between the headphone 500 and the information processor 200 to a connection between the headphone 500 and the information processor 100.

(Operation S43) The controller 211 determines whether or not a preparation completed notification has been received as a response to the switching request. The preparation completed notification indicates the completion of the preparation for switching the communication. If the preparation completed notification has been received (Operation S43: YES), the processing advances to Operation S44. Conversely, if the preparation completed notification has not been received (Operation S43: NO), the processing of Operation S43 is repeated.

(Operation S44) The controller 211 disconnects the connection with the headphone 500. Then the processing is completed.

(Operation S45) The controller 211 sends a disconnection refusal that indicates refusal of the disconnection with the headphone 500, to the information processor 200. Then the processing is completed.

Figure 17:
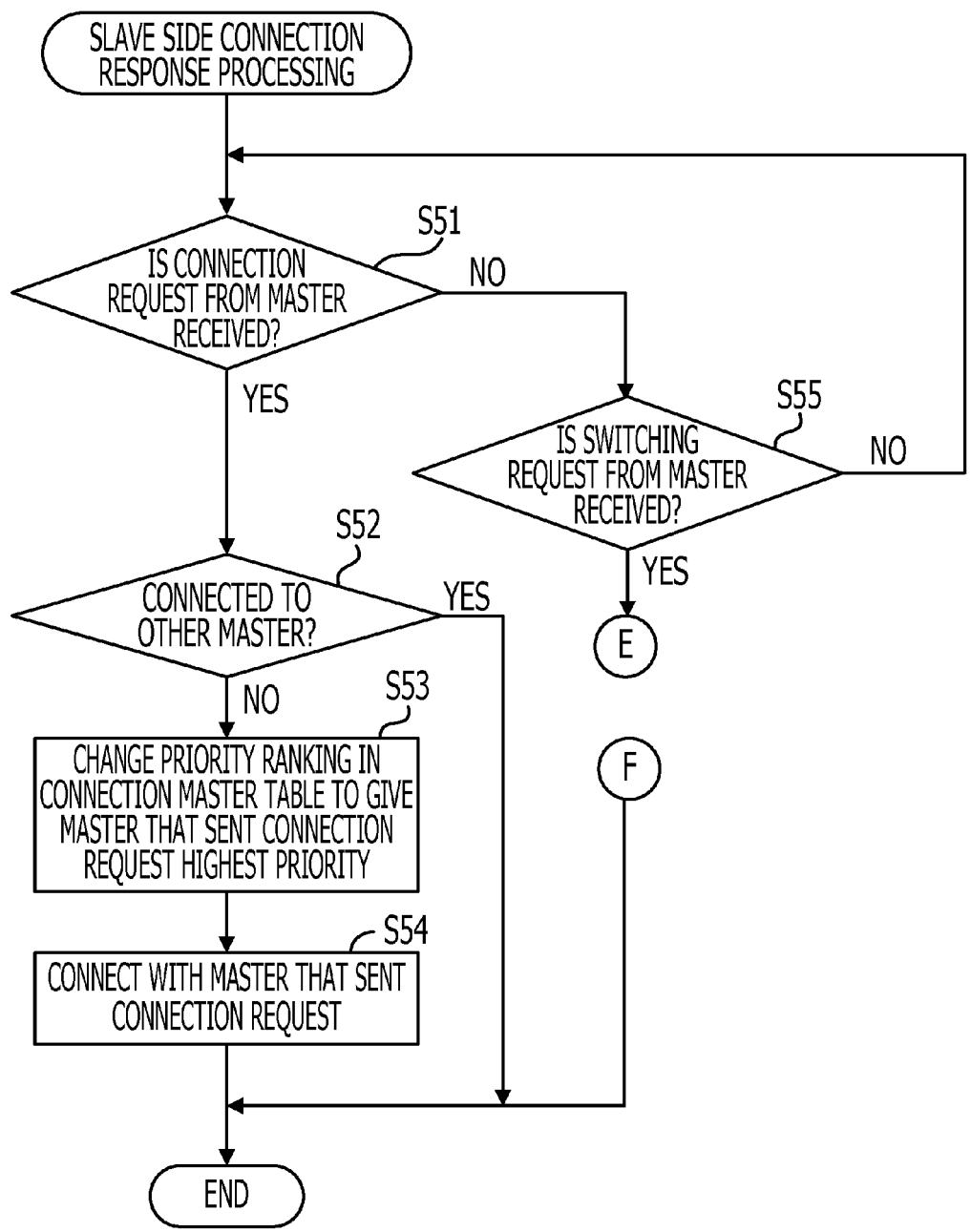
FIG. 17 is a flow chart illustrating slave side connection response processing according to the second embodiment.
Figure 18:
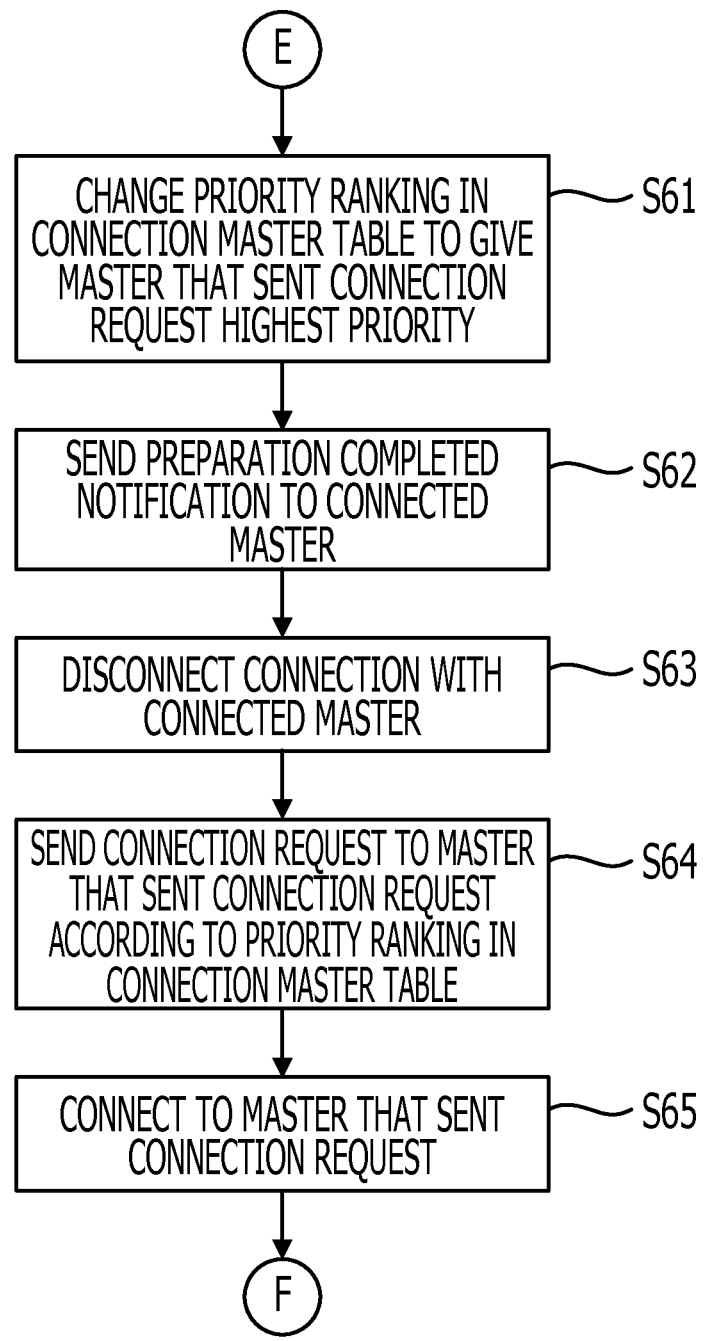
FIG. 18 is a flow chart illustrating slave side connection response processing according to the second embodiment.

FIGS. 17 and 18 represent a flow chart illustrating slave side connection response processing according to the second embodiment. The slave side connection response processing is processing conducted by the slave device for carrying out connection operations in response to a connection request from a master device. The slave side connection response processing is conducted continuously or periodically by the slave device. The slave side connection response processing illustrated in FIGS. 17 and 18 will be described below with flowchart process numbers. In the following example, the slave device is the headphone 500 and the master device connected to the slave device is the information processor 200 as described above. Further, in the following example, the headphone 500 is connected to the information processor 200 and the information processor 100 is requesting connection for communication with the headphone 500.

(Operation S51) The controller 501 of the headphone 500 determines whether or not a connection request has been received from a master device (e.g., the information processor 100). If the connection request has been received (Operation S51: YES), the processing advances to Operation S52. Conversely, if the connection request is not received (Operation S51: NO), the processing advances to Operation S55.

(Operation S52) The controller 501 determines whether or not a master device besides the information processor 100 is connected to the headphone 500. If the headphone 500 and the information processor 200 are connected (Operation S52: YES), the connection with the information processor 200 is maintained and the processing is finished. Conversely, if the headphone 500 and the information processor 200 are not connected (Operation S52: NO), the processing advances to Operation S53.

(Operation S53) The controller 501 changes the priority ranking in the connection master table to give the information processor 100 that sent the connection request the highest priority.

(Operation S54) The controller 501 connects to the information processor 100 as the master device with the highest priority based on the priority ranking in the connection master table. Then the processing is completed.

(Operation S55) The controller 501 determines whether or not the switching request from the connected master device such as the information processor 200 has been received. The switching request is a request to switch the connection with the information processor 200 to a connection with the information processor 100 or other master device that requests the connection. If the switching request has been received (Operation S55: YES), the processing advances to Operation S61 (FIG. 18). Conversely, if the switching request has not been received (Operation S55: NO), the processing returns to Operation S51. As described above, the switching request includes master information of the information processor 100 that requests switching the connection with the headphone 500.

(Operation S61) The controller 501 changes the priority ranking in the connection master table to give the information processor 100 that sent the connection request the highest priority.

(Operation S62) The controller 501 sends the preparation completed notification indicating the completion of the preparation to disconnect the connection, to the information processor 200.

(Operation S63) The controller 501 disconnects the connection with the information processor 200.

(Operation S64) The controller 501 connects with the information processor 100 that is the master device with the highest priority based on the priority ranking in the connection master table.

(Operation S65) The controller 501 receives a response from the information processor 100 in response to the connection request and connects to the information processor 100. Then the processing is completed.

According to the second embodiment as described above, switching of connections between the master devices such as the information processors 100 and 200 and the slave device that is the headphone 500 can be conducted automatically through wireless communication. As a result, the master device connected to the headphone 500 can be switched easily from the information processor 200 (a first device) to the information processor 100 (a second device).

Furthermore, the headphone 500 can check the information processor 100 with the connection master information in the connection master table against the master information from the information processor 100. As a result, a connection between the headphone 500 (a slave device) and an improper master device can be prevented.

The controller 111 sends the disconnection request including the master information of the information processor 100 to the information processor 200 when the controller 111 receives the connection refusal. The information processor 200 sends the master information of the information processor 100 with the switching request to the headphone 500 based on the disconnection request. The headphone 500 sends the connection request to the information processor 100 according to the received master information of the information processor 100. As a result, the connection between the information processor 200 (a first master device) and the headphone 500 (the slave device) is easily switched to a connection between the information processor 100 (a second master device) and the headphone 500 (the slave device).

The controller 111 receives the connection slave information indicating permission to switch the connection and then sends the disconnection request to the information processor 200. As a result, the disconnection request is not sent if switching the connection is not permitted because the information processor 200 (the master device) and the headphone 500 (the slave device) are in communication or some other reason. Therefore, wasteful sending of the disconnection request can be controlled.

The controller 111 sends the master information with the disconnection request to the information processor 200. As a result, transmission of control signals can be carried out efficiently.

The controller 211 sends the master information sent by the information processor 100 (the first master device) and the switching request to switch the connection between the headphone 500 (the slave device) and the information processor 200 (the second master device) to the connection between the headphone 500 (the slave device) and the information processor 100 (the first master device). As a result, the connection can be easily switched.

When the information processor 200 is connected to the headphone 500, the controller 211 first sends the connection slave information that indicates whether or not the state of the connection with the headphone 500 can be switched and indicates the connection state with the headphone 500, to the information processor 100 when the connection slave information request is received from the information processor 100. As a result, the information processor 100 (the master device) is notified whether or not the connection can be switched, and the information processor (the master device) abandons the switching if the switching of the connection is not permitted. As a result, wasteful processing and processing delays can be controlled.

The controller 211 sends the master information of the information processor 100 along with the switching request to the headphone 500. As a result, transmission of control signals can be carried out efficiently.

Conversely, the controller 211 does not send the connection slave information to the information processor 100 if the information processor 200 is not connected to the headphone 500 when the controller 211 receives the connection slave information request from the information processor 100. As a result, efficiency of transmitting control signals and control processing can be improved since only the master device connected to the headphone 500 (the slave device) sends the connection slave information to the information processor 100 (another master device).

The controller 501 sends the connection request to the information processor 100 based on the master information when the disconnection of the connection with the information processor 200 is completed if the switching request and the master information of the information processor 100 sent by the information processor 200 are received. As a result, switching of the connections between the information processors 100 and 200 (master devices) and the headphone 500 (slave device) can be conducted easily.

Although the present embodiment has been described with information processors and headphones, these are merely examples and the embodiments are applicable to any electronic device. Exemplary applicable electronic devices include, but are not limited to, portable terminal devices such as portable televisions, portable game devices, electronic dictionaries, and PDAs; audio equipment such as earphones, speakers, and microphones; and peripheral devices such as printers, scanners, external storage devices, remote controllers, mice, keyboards, trackballs, digitizers, touch panels and touch pens.

The above functions are implemented by a computer. In this case, the abovementioned processing contents of functions of the information processors 100 and 200 and the headphone 500 are provided by programs. The programs are implemented by the computer so that the abovementioned processing functions can be implemented on the computer. Programs including the processing contents may be recorded on a computer-readable recording medium. Computer-readable recording media include, for example, a magnetic storage device, an optical disk, a magneto-optic recording medium, a semiconductor memory and the like. The magnetic storage device includes a hard-disk device, a flexible disk (FD), electromagnetic tape, and the like. The optical disk includes a Blu-ray disk, a DVD, a DVD-RAM, and a CD-ROM/RW. The magneto-optic recording medium includes a magneto-optical disk (MO). The recording medium/media may be non-transitory.

When the programs are distributed, the programs may be sold, for example, as programs recorded on a portable recording medium such as a DVD or a CD-ROM and the like. Furthermore, the programs may be stored in a storage device of a server computer and transferred from the server computer to another computer through a network.

The computer that implements the programs may store the programs recorded on a portable recording medium or transferred from a server computer onto the computer's own storage device. The computer can then read the programs from the storage device and implement the processing according to the programs. The computer may implement the processing directly according to programs read from a portable recording medium. Moreover, the computer may implement the processing according to programs sequentially transferred from the server computer connected through a network.

Moreover, the abovementioned processing functions may be implemented at least partially with an electronic circuit such as a digital signal processor (DSP), an application specific integrated circuit (ASIC), a programmable logic device (PLD), and the like.

The abovementioned electronic devices and the wireless communication control programs have been described according to the illustrated embodiments. However, the above embodiments merely illustrate a principle of the present disclosure. Various variations and modifications may be made to the present disclosure by a person skilled in the art and the present disclosure is not limited to the exact configurations and applications described above. Various configurations having similar functions may be substituted for parts of the configurations. Furthermore, other arbitrary constituent parts or processes may be added to the present disclosure. Two or more arbitrary configurations in the abovementioned embodiments may be combined. Moreover, all modifications and equivalent elements corresponding to the present disclosure are considered to fall within the scope of the present disclosure according to the appended claims and equivalents.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosures have been described in detail, it should be understood that the various changes, substitutions, and alterations could be made hereto without departing from the spirit and scope of the disclosure.

What is claimed is:

1. An electronic device comprising:
   a storage that stores information identifying the electronic device,
   a communication device, and
   a controller that, when starting connection of the electronic device with a first other electronic device, sends the information identifying the electronic device to a second other electronic device when the first other electronic device is connected to the second other electronic device, and connects the electronic device to the first other electronic device when a request for connection with the first other electronic device is sent from the first other electronic device and received by the electronic device, the first other electronic device receiving the information identifying the electronic device from the second other electronic device.

2. The electronic device according to claim 1, wherein the controller sends a request for connection to the first other electronic device and sends the information identifying the electronic device to the second other electronic device when the controller receives a refusal for connection in response to the request.

3. The electronic device according to claim 1, wherein the controller receives information on a connection state from the second other electronic device, and sends to the second other electronic device a request for terminating a connection between the first other electronic device and the second other electronic device when the information on a connection state indicates that switching a current connection to a connection between the first other electronic device and the electronic device is permitted.

4. The electronic device according to claim 3, wherein the controller sends the request for terminating to the second other electronic device, the request including the information identifying the electronic device.

5. The electronic device according to claim 3, wherein the controller sends the request for information on a connection state when the first other electronic device and the second other electronic device are connected.

6. The electronic device according to claim 5, wherein the controller sends the request for information on a connection state without specifying an electronic device to be connected.

7. The electronic device according to claim 1, wherein one of the electronic device and the second other electronic device is exclusively connected to the first other electronic device.

8. The electronic device according to claim 1, wherein the communication device is connected to the second other electronic device through wireless communication.

9. An electronic device comprising:
   a communication device; and
   a controller that, when the electronic device is connected with a first other electronic device, sends information on a second other electronic device and a switching request that requests terminating a connection between the first other electronic device and the electronic device and requests connecting the first other electronic device and the second other electronic device, directly to the first other electronic device when information for identification of the second other electronic device is received from the second other electronic device.

10. The electronic device according to claim 9, wherein the controller sends, to the second other electronic device, information on a connection that indicates whether or not switching a current connection between the electronic device and the first other electronic device to a connection between the electronic device and the second other electronic device is permitted, when a request for information on a connection state that requests sending of the information on the connection between the electronic device and the second other electronic device.

11. The electronic device according to claim 9, wherein the controller sends the request for switching, the request including information on the second other electronic device.

12. The electronic device according to claim 9, wherein the communication device is connected to the second other device through wireless communication.

13. The electronic device according to claim 10, wherein the controller does not send the information on connection when the request for information on a connection state is received from the second other electronic device when the electronic device is not connected to the first other electronic device.

14. An electronic device comprising:
a communication device; and
a controller that directly sends to a first other electronic device a request for connection between the electronic device and the first other electronic device when a termination of a current connection between the electronic device and a second electronic device is completed, when information for identification of the first other electronic device, a request for terminating a current connection between the electronic device and the second other electronic device, and a request for switching the current connection to a connection between the electronic device and the first other electronic device are received from the second other electronic device that is currently connected to the electronic device.

15. The electronic device according to claim 14, wherein the communication device is connected to the first other electronic device through wireless communication.

* * * * *